United States Patent [19]
Loeffler et al.

[11] Patent Number: 5,947,029
[45] Date of Patent: *Sep. 7, 1999

[54] METHOD FOR ASSESSING THE QUALITY OF A MULTI-COLOR PRINT IMAGE

[75] Inventors: Gerhard Loeffler, Duderstadt; Nikolaus Pfeiffer, Heidelberg; Manfred Schneider, Bad Rappenau, all of Germany

[73] Assignee: Heidelberger Druckmaschinen Aktiengesellschaft, Heidelberg, Germany

[ * ] Notice: This patent issued on a continued prosecution application filed under 37 CFR 1.53(d), and is subject to the twenty year patent term provisions of 35 U.S.C. 154(a)(2).

[21] Appl. No.: 09/015,161
[22] Filed: Jan. 29, 1998

[30] Foreign Application Priority Data

Jan. 29, 1997 [DE] Germany .............................. 197 03 129

[51] Int. Cl.$^6$ .............................. B41F 31/04; B41F 33/16
[52] U.S. Cl. ............................................ 101/484; 101/365
[58] Field of Search ..................................... 101/365, 483, 101/484, 485, 181, 211; 382/112, 162, 165, 167; 250/559.39, 559.06, 559.2, 559.01

[56] References Cited

U.S. PATENT DOCUMENTS

| | | | |
|---|---|---|---|
| 4,660,159 | 4/1987 | Ott | 250/559.39 |
| 4,947,746 | 8/1990 | Jeschke et al. | |
| 5,089,977 | 2/1992 | Pflästerer et al. | |
| 5,122,977 | 6/1992 | Pfeiffer | |
| 5,170,711 | 12/1992 | Maier et al. | 101/365 |
| 5,551,342 | 9/1996 | Fuchs et al. | 101/484 |

FOREIGN PATENT DOCUMENTS

| | | |
|---|---|---|
| 0 490 093 | 9/1994 | European Pat. Off. |
| 36 43 721 | 12/1986 | Germany |
| 37 07 027 | 3/1987 | Germany |
| 39 03 981 | 2/1989 | Germany |
| 43 21 177 | 6/1993 | Germany |
| 43 35 299 | 10/1993 | Germany |
| 195 15 499 | 4/1995 | Germany |

OTHER PUBLICATIONS

Advances in Printing Science and Technology, proceedings of the 18th International Conference of Printing Research Institutes, Williamsburg, USA, Jun. 1985, pp. 66–79.

*Primary Examiner*—J. Reed Fisher
*Attorney, Agent, or Firm*—Kenyon & Kenyon

[57] ABSTRACT

In a process for assessing the quality of a print image produced on a printing material in a multi-color printing process, in which signals which reproduce print-image elements are generated with an image-recording arrangement, in which color values are derived from the signals for every print-image element, in which the color values are transformed into color measures of a predetermined color space, in which color distances between an actual color site and a desired reference color site are determined for the print-image elements, correction variables of the control elements (18, 19, 20, 21), whose effect on a control element (18) would cause the actual color sites to be as close as possible to the reference color sites, are calculated from the color distances and stored in memory, that the color-distance vectors ($\Delta L_{Bn}$, $\Delta a_{Bn}$, $\Delta b_{Bn}$) and color distances ($\Delta E_{Bn}$) of at least one predetermined reference image ($B_n$) with homogeneous area coverage are determined as a measure for the quality in the said print-image region, the correction variables ($\Delta s_B$, $\Delta s_C$, $\Delta s_M$, $\Delta s_Y$) which are necessary for compensation of the color distances ($\Delta E_{Bn}$) in the reference image ($B_n$) corresponding to the previously calculated and stored correction variables.

3 Claims, 5 Drawing Sheets

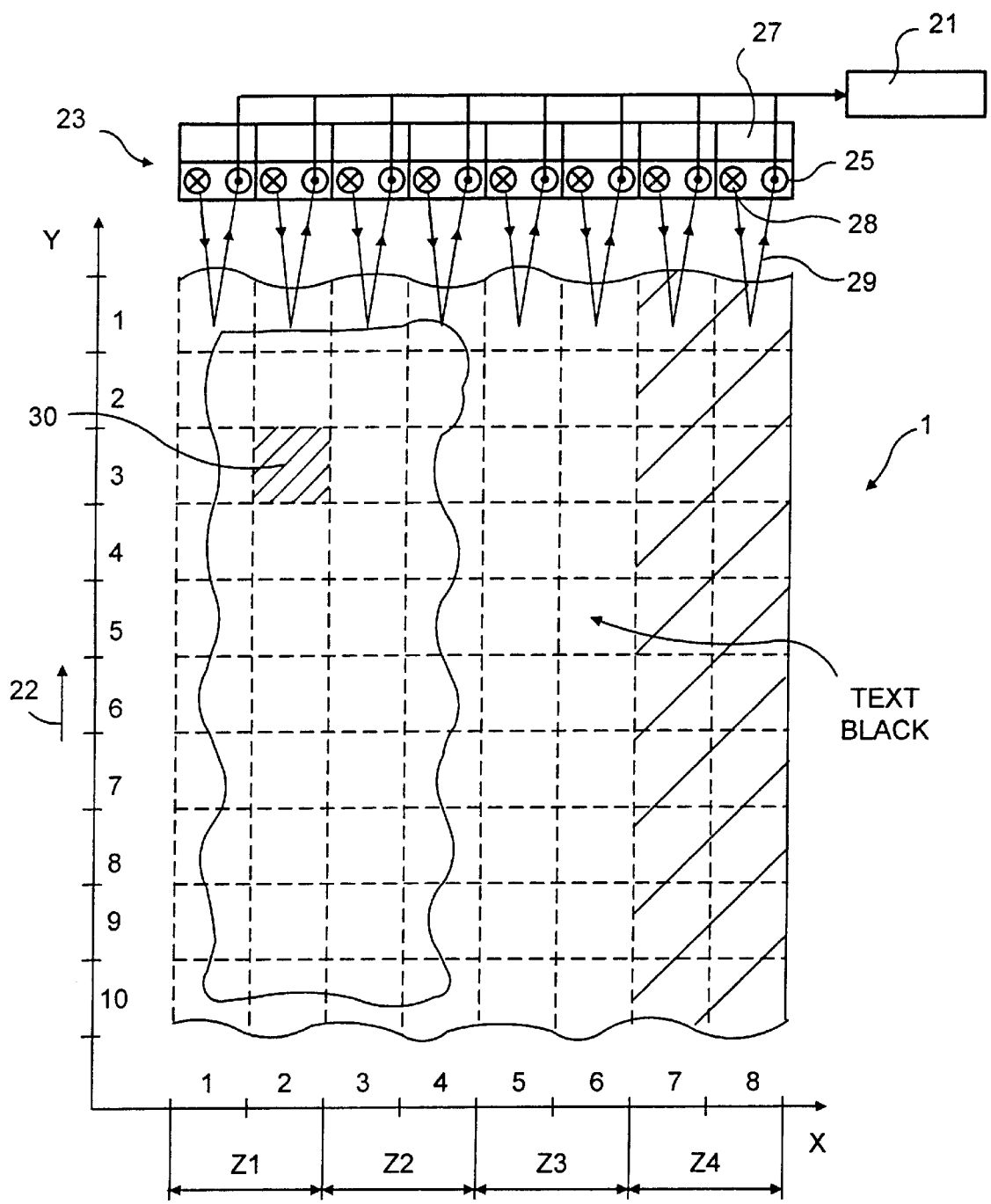
F I G. 3

5,947,029

METHOD FOR ASSESSING THE QUALITY OF A MULTI-COLOR PRINT IMAGE

FIELD OF THE INVENTION

The present invention relates to a process for assessing the quality of a print image produced on a printing material in a multi-color printing process.

RELATED TECHNOLOGY

For quality control of multi-color prints, it is known to determine the color site in a color space for a predetermined measurement location, using color measurements. The distance between the measured actual color site and a reference color site is a characteristic variable for the quality of the print image at the said measurement site, and is referred to as the color distance $\Delta E$.

In the case of printing machines in which the ink application of the individual colors to be printed over one another is controlled in zones which lie crosswise to the printing direction, it is known to determine the actual color sites at a plurality of measurement sites in each zone, it being possible to correct the measurement values with weighting factors, as a function of the print image, in order to determine a median color distance for each zone, for example, It is also possible to indicate a color distance which is characteristic for the quality of the entire sheet, using a mathematical algorithm, from the mean color distances of the zones. The color distances for a specific measurement site, for a zone, or for the entire print image can be averaged over several print images, in order to reduce errors in the quality assessment. The color distances can be stored in memory, used for color regulation, or displayed in a visual form.

The quality measurement values obtained in this way are only suitable for comparing the printed copies within one job order or with copies of repeat job orders. If the quality of print images with a different image content is to be compared, then the color distances which were derived for the print images according to the method described above result in errors in the assessment, because the color distances determined for each measurement site are dependent on the color sites themselves and on the way in which the print-image elements to be measured at the measurement sites were produced from the individual colors. For example, color distances of print images which predominantly contain print-image elements produced with full tones must be assessed in a different way than those from print images which predominantly contain print-image elements produced in a multi-color raster. Likewise, color distances which are derived from gray fields produced with cyan, magenta, and yellow, for example, must be differentiated from those which come from gray fields produced with black as the color.

Furthermore, errors in the quality assessment of different images occur if only the color distance is used for an assessment, and the direction is not taken into consideration.

The color site of a print-image element results from three values for the predetermined color space in which the color distances are to be determined. For the color space L*a*b defined by the International Illumination Commission (Commission Internationale d'Eclairage, CIE), these are brightness L*, saturation C*, and the color-shade angle h*$_{ab}$, or brightness L* and the coordinates of the green-red axis a* and the blue-yellow axis b*.

The mean color distance $\Delta E_M$, derived for a color zone from a plurality of print-image elements as a quality measure in known methods, cannot be derived from the mean color distance vectors. Vice versa, the mean color distance $\Delta E_M$ which results from the mean value of the color distances $\Delta E$ of the print image elements of a zone cannot be broken down into color-distance vectors. However, it is necessary to use the individual coordinate values, together with the color distance, for an assessment of the quality of a print image, because brightness deviations, for example, are better tolerated than color deviations.

Furthermore, it is disadvantageous that in the case of prints which include print-monitoring elements for control of a printing machine, in addition to the actual print image, the color distances determined from the print image do not agree with the color distances which are determined from gray-balance or full-tone measurement fields from the print-monitoring elements, for example.

SUMMARY OF THE INVENTION

The present invention provides a process for assessing the quality of print images, which makes it possible to compare print images with different image contents, while avoiding the aforementioned disadvantages.

The present invention therefore provides a process for assessing the quality of a print image produced on a printing material in a multi-color printing process, in which signals which reproduce print-image elements are generated with an image-recording arrangement, in which color values are derived from the signals for every print-image element, in which the color values are transformed into color measures of a predetermined color space, in which color distances between an actual color site and a desired reference color site are determined for the print-image elements, and in which a measure for the quality in at least one print-image region, in which the ink application can be controlled with at least one control element, is derived from the color distances. The process is characterized in that correction variables of the control elements (18, 19, 20, 21), whose effect on a control element (18) would cause the actual color sites to be as close as possible to the respective reference color sites, are calculated from the color distances and are stored in memory, that the color-distance vectors ($\Delta L_{Bn}$, $\Delta a_{Bn}$, $\Delta b_{Bn}$) and color distances ($\Delta E_{Bn}$) of at least one predetermined reference image ($B_n$) with homogeneous area coverage are determined as a measure for the quality in the said print-image region, the correction variables ($\Delta s_B$, $\Delta s_C$, $\Delta s_M$, $\Delta s_Y$) which are necessary for compensation of the color distances ($\Delta E_{Bn}$) in the reference image ($B_n$) corresponding to the previously calculated and stored correction variables.

Further advantageous developments include that: (1) a virtual print-monitoring element is selected as the reference image ($B_n$) and (2) that in the case of a print which was produced by printing the printing inks (16) cyan (C), magenta (M), yellow (Y), and black (B) over one another, a gray-balance field is selected as the reference image ($B_n$) for the printing inks (16) cyan (C), magenta (M), and yellow (Y), and a field composed of the printing ink (16) black (B) is selected as the reference image ($B_n$) for the printing ink (16) black (B).

Because color distances and color-distance vectors which would result in the same correction-variable changes of the printing inks involved as the correction-variable changes which result from the measured print-image elements are derived as a quality measure for a reference image with homogeneous area coverage, different print images are comparable with regard to quality.

In this connection, it is practical to relate the color distances and color-distance vectors to zones in which the ink application can be influenced with correction elements. As another quality measure, the mean value of the color distances of the zones can be determined.

If an image with homogeneous area coverage, for example a gray-balance image, is selected as the reference image, then the mean color distance of the reference image that is derived for a zone can be broken down into color-distance vectors. If a gray-balance image which corresponds to a print-monitoring strip is selected as the reference image, then the quality measure agrees with the quality measure derived from the print-monitoring elements. It is possible to provide a reference image for each zone or group of zones. If the print image is composed of several colors, then individual reference images can be provided for each color or group of colors, e.g, the printing inks cyan, magenta, and yellow.

BRIEF DESCRIPTION OF THE DRAWINGS

The present invention will be explained in greater detail below on the basis of an exemplary embodiment of which:

FIG. 3 shows a schematic for determining actual color sites, and

DETAILED DESCRIPTION

Figure 1:
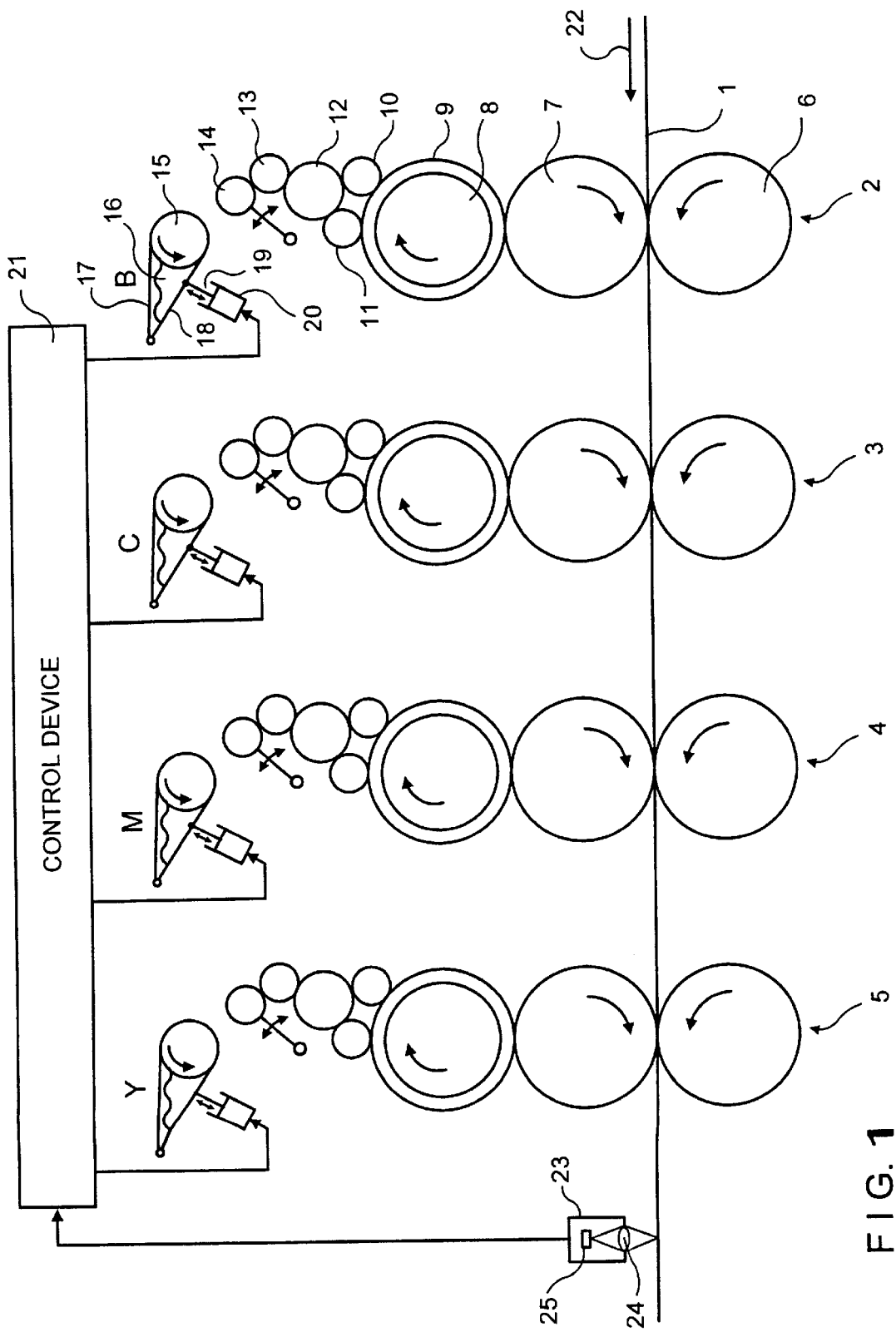
FIG. 1 shows a schematic of a printing machine for multi-color printing.

FIG. 1 shows the schematic of a printing machine with which the four colors black B, cyan C, magenta M, and yellow Y can be imprinted onto a web, one over the other and one after the other. The offset printing machine comprises four print units 2, 3, 4, 5, Each print unit 2, 3, 4, 5 comprises a print cylinder 6, a transfer cylinder 7, and a printing form cylinder 8. A printing form 9 is attached to printing form cylinder 8; it contains ink-attracting and ink-repelling regions, in accordance with an image to be printed. Ink-application rollers 10, 11 are set against printing form 9. Ink-transfer rollers 12, 13 are arranged ahead of ink-application rollers 10, 11. Ductor rollers 14 can be periodically set against ink-fountain rollers 15 and ink-transfer rollers 13. Ink-fountain rollers 15 dip into ink 16 which is located in ink fountains 17. At each ink fountain 17, four ink blades 18 can be tangentially set against ink fountain roller 15, in each instance. To set ink blades 18 on and take them away, they are coupled with pistons 19 of compressant-operated working cylinders 20. Working cylinders 20 are connected with a control device 21. In case of synchronous drive of print units 2, 3, 4, 5, the web is transported in direction 22 and consecutively imprinted with four printing inks 16 in colors B, C, M, Y. To obtain signals which reproduce the print image, an image-recording arrangement 23 is arranged after last print unit 5. Image-recording arrangement 23 comprises, among other things, optical imaging elements 24 and photoelectric components 25. Image-recording arrangement 23 reaches over the entire width of web 1. There is a connection between photoelectric component 25 and control device 21.

Figure 2:
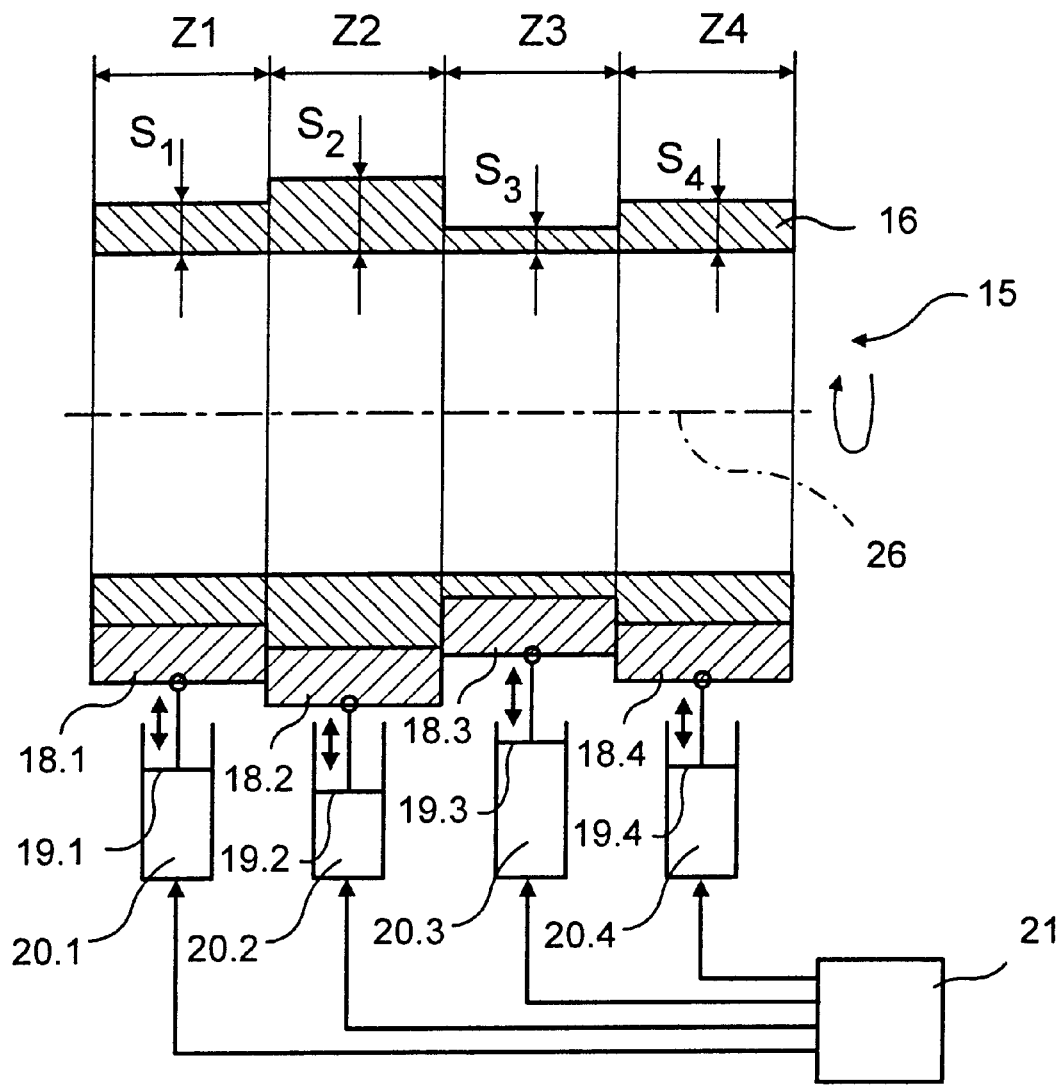
FIG. 2 shows a schematic of an ink-metering device.

FIG. 2 shows, in greater detail and for a print unit 2, 3, 4, 5, how the ink application on web 1 is controlled. Four ink blades 18.1 to 18.4 are assigned to an ink fountain roller 15, parallel to axis 26, without gaps. Ink blades 18.1 to 18.4 are coupled with pistons 19.1 to 19.4, which work together with working cylinders 20.1 to 20.4. Working cylinders 20.1 to 20.4 can each be separately acted on by compressant, which is controlled by control device 21. The sum of the widths of ink blades 18.1 to 18.4 is at least as great as the width of web 1. In accordance with the ink requirement in a zone Z1 to Z4, ink blades 18.1 to 18.4 are adjusted at different distances from the surface area of ink-fountain roller 15. As ink-fountain roller 15 rotates in ink fountain 17, an ink profile with layer thicknesses $s_1$ to $s_4$ forms on the surface area of ink-fountain roller 15, in zones Z1 to Z4. In accordance with a clock pulse and contact times of ductor roller 14, the ink profile in each instance is transferred to printing form 9 using ink-transfer rollers 12, 13 and ink-application rollers 10, 11. The ink-attracting regions of printing form 9 are inked. The print image is transferred from form 9 to the transfer cylinder in each instance, and from there to web 1.

Figure 4A:
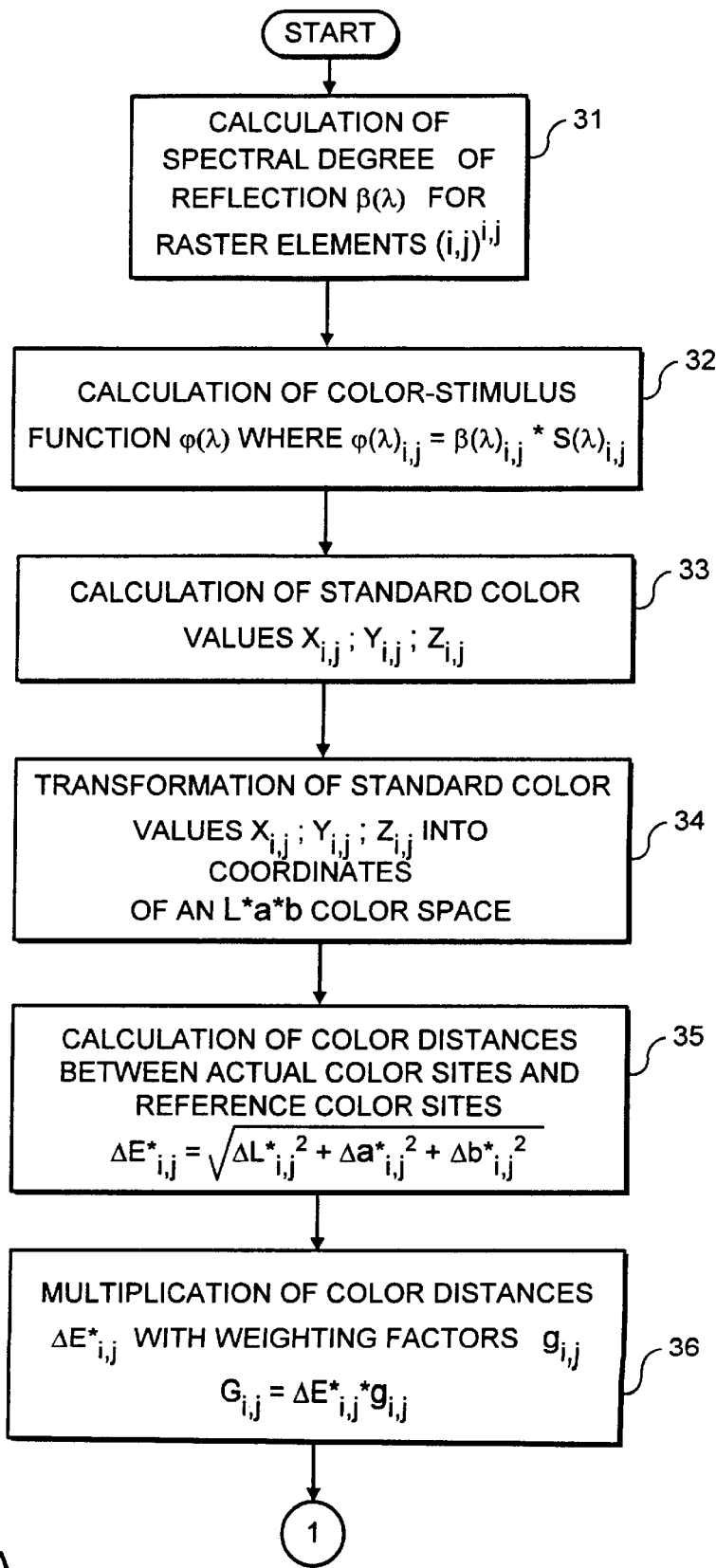
FIGS. 4a and 4b show a flow chart for implementation of the process.
Figure 4B:
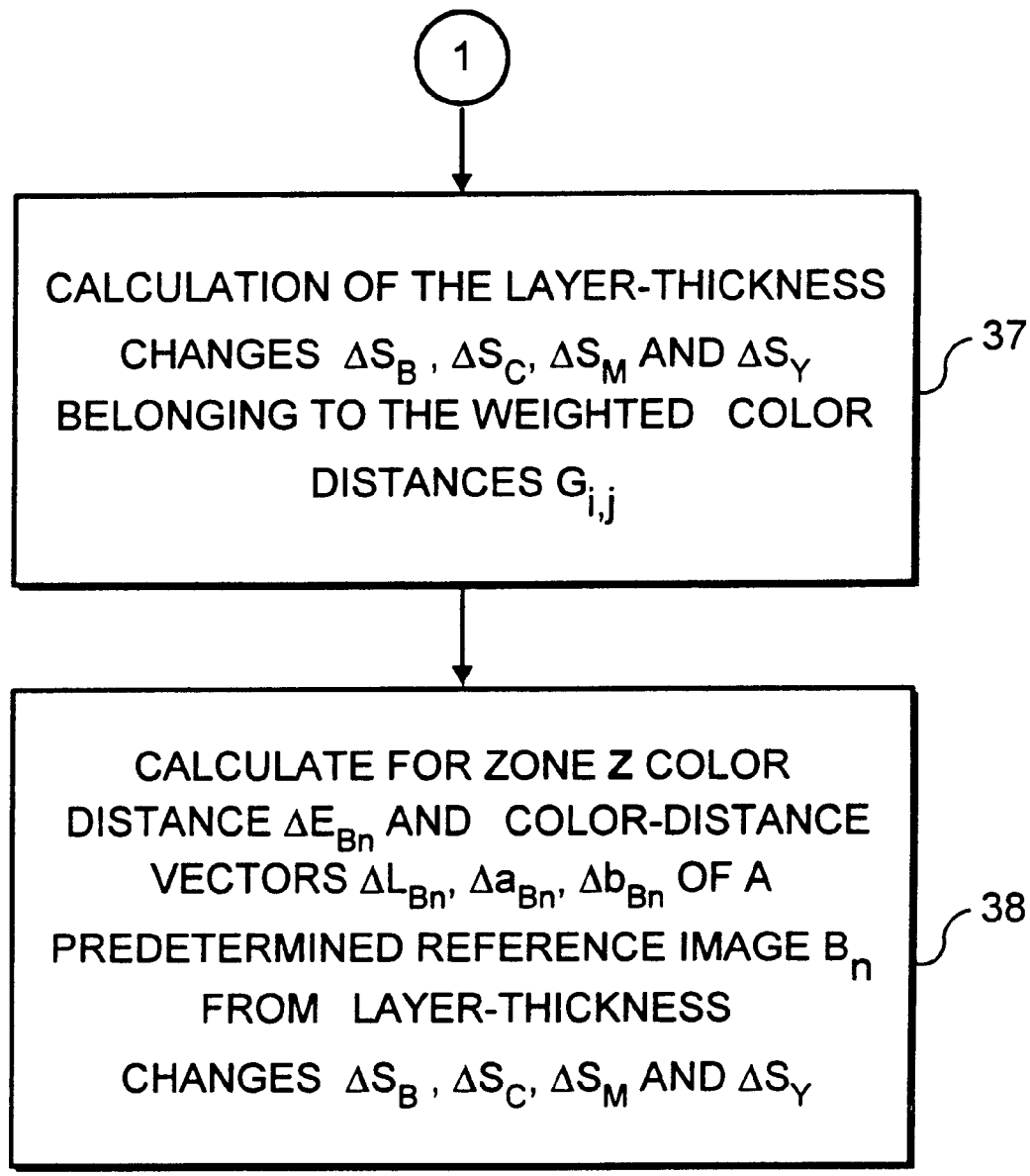

FIG. 3 shows the mode of operation of image-recording arrangement 23 in greater detail. Image-recording arrangement 23 possesses a modular construction, with two sending-receiving modules 27 being assigned to each of zones Z1 to Z4 of the print. A sending-receiving module 27 comprises a light source 28, the light of which illuminates a track on the surface of web 1 as web 1 moves in direction 22, in each instance: in this exemplary embodiment, the track corresponds to half the width of a zone Z1 to Z4. Light 29 reflected by the surface of web 1 is received by photo-electric elements 25 in such a way that the entire surface of web 1 is scanned in a raster pattern. The light reflected by a raster element 30 is subjected to a color measurement in accordance with the spectral method of the German standard DIN 5033 Part 4; image-recording arrangement 23 and control device 21 are structured accordingly for this purpose. Implementation of the process will be described below, on the basis of the flow chart in FIG. 4 in combination with FIG. 3:

As shown in FIG. 3, let raster elements 30 lie in coordinate rasters of a Cartesian coordinate system (x, y). Accordingly, a print image of web 1 contains raster elements 30 which lie in direction x at i=1 to 8, and j raster elements 30 which lie in direction y at j=1 to 10. Coordinate direction y lies parallel to transport direction 22. In a first step 31, spectral degree of reflection $\beta(\gamma)_{i,j}$ is determined for every raster element 30 (i, j). The $\gamma$ in parentheses is intended to express that the degree of reflection $\beta$ is a function of the wavelength $\gamma$ of reflected light 29.

In the determination of spectral degree of reflection $\beta(\gamma)_{i,j}$, the method of procedure is that degree of reflection $\beta(\gamma)_{i,j}$ is determined for the entire spectral range which is visible to the human eye, for example in a range from 380 nm to 780 nm, in steps of 5 nm, for example. In a second step 32 spectral reflection $\beta(\gamma)_{i,j}$ is multiplied, for a raster element 30, with the radiation function $S(\gamma)$ of a desired standard light type, resulting in the color-stimulus function $\phi(\gamma)_{i,j}$ of raster element 30 in question. In a third step 33 standard color values $X_{i,j}$, $Y_{i,j}$, and $Z_{i,j}$ are calculated for each raster element 30, according to the following equations:

$$X_{ij} = k \int_K^L \varphi_{ij}(\lambda) * \overline{x}(\lambda) * d\lambda$$

$$Y_{ij} = k \int_K^L \varphi_{ij}(\lambda) * \overline{y}(\lambda) * d\lambda$$

$$Z_{ij} = k \int_K^L \varphi_{ij}(\lambda) * \overline{z}(\lambda) * d\lambda$$

Variables $\overline{x}(\gamma)$, $\overline{y}(\gamma)$, and $\overline{z}(\gamma)$ designate the normal spectral value function of a selected normal observer for a defined visual-field variable of, for example, 2° and a defined observation distance of 1 m, for example. Normal spectral value functions $\overline{x}(\gamma)$, $\overline{y}(\gamma)$, and $\overline{z}(\gamma)$ are variables which have been internationally standardized (International Illumination Commission CIE). Integral limits K, L cover the entire visible range. Factor k is a constant which is calculated according to the equation:

$$k = \frac{Y}{\int S(\lambda) * y(\lambda) * d\lambda}$$

In this connection, k is calculated for a completely matte white surface, with Y being set to the value 100 for this purpose. The color of raster element 30 can be precisely described with the standard color values $X_{i,j}$, $Y_{i,j}$, $Z_{i,j}$. Since color distances in the XYZ color space deviate greatly from the color differences perceived by a human being, it is common practice to transform these variables into a color space which guarantees (good agreement between measured and perceived color distances. For this exemplary embodiment, the L*a*b color space CIE 1976, which was defined by the CIE, will be used as the basis of discussion. The process is continued in a step 34, in which the standard color values $X_{i,j}$, $Y_{i,j}$, and $Z_{i,j}$ are transformed into the Cartesian coordinates $L^*_{i,j}$, $a^*_{i,j}$, and $b^*_{i,j}$ of the L*a*b color space. In the transformation, the following mathematical calculations are performed in control device 21:

$$L_{ij}^* = 116 * 3\sqrt{Y_{ij}/Y_n} - 16$$
$$a_{ij}^* = 500 * \left[3\sqrt{X_{ij}/X_n} - 3\sqrt{Y_{ij}/Y_n}\right]$$
$$b_{ij}^* = 200 * \left[3\sqrt{Y_{ij}/Y_n} - 3\sqrt{Z_{ij}/Z_n}\right]$$

$X_n$, $Y_n$, and $Z_n$ are the standard color values of a completely matte white element under illumination with a defined type of light. Standard color values $X_n$, $Y_n$, and $Z_n$ establish the achromatic point as the coordinate origin of the L*a*b color space. The numerical triple ($L^*_{i,j}$, $a^*_{i,j}$, $b^*_{i,j}$) represents the actual color site $E^*_{ijACTUAL}$ of raster element 30(i,j). Due to the effect of interference factors on the printing process, actual color site $E^*_{ijACTUAL}$ has a deviation from a desired reference color site $E^*_{ijREFERENCE}$. Reference color sites $E^*_{ijREFERENCE}$ are, for example, the values of an acceptable print image which the customer for the prints has predetermined as a reference print image to be aimed at in terms of quality. By using the Pythagorean theorem, color distance $\Delta E^*_{i,j}$ between actual color site $E^*_{ijACTUAL}$ and reference color site $E^*_{ijREFERENCE}$ is calculated according to the following equation in a step 35:

$$\Delta E^*_{i,j} = \sqrt{\Delta L^*_{i,j}{}^2 + \Delta a^*_{i,j}{}^2 + \Delta b^*_{i,j}{}^2}$$

Color distances $\Delta E^*_{i,j}$ and color-distance vectors $\Delta L_{i,j}^*$, $\Delta a_{i,j}^*$, $\Delta b_{i,j}^*$ determined in this way are multiplied by weight factors $g_{i,j}$ specific to the raster element, in a step 36. This takes into account the fact that depending on the homogeneity of the area coverage in the surroundings of raster element 30, the location of actual color site $E^*_{ijACTUAL}$, and the way in which the print was produced in raster element 30, color distances $\Delta E^*_{i,j}$ are weighted differently. For example, color distances $\Delta E^*_{i,j}$ of raster elements 30 produced in full-tone printing have a lesser weight than color distances $\Delta E^*_{i,j}$ of raster elements 30 produced in raster-tone printing. Because color distances $\Delta E^*_{i,j}$ are more noticeable to the human eye in homogeneously structured print-image regions than color distances $\Delta E^*_{i,j}$ in high-contrast, colorful print-image regions, different weighting factors $g_{i,j}$ are also used in the respective raster elements of said print-image regions.

As was already described above, the actual print image results from superimposed printing of four printing inks 16 B, C, M, Y. In a next step 37, layer-thickness changes $\Delta s$ which must be adjusted in a zone $Z_K$ using working cylinders 20 for each printing ink 16 B, C, M, Y in order to bring the existing color distances $\Delta E^*_{i,j}$ to a value of 0 are determined from the weighted color distances $G_{i,j} = \Delta E^*_{i,j} * g_{i,j}$.

For each raster element $30_{i,j}$ of one of zones Z1 to Z8, three equations can be established, in accordance with the following rules:

$$\Delta L_{i,j} = \frac{\delta L_{ij}}{\delta s_B} * \frac{\Delta s_B}{s_B} + \frac{\delta L_{ij}}{\delta s_C} * \frac{\Delta s_C}{s_C} + \frac{\delta L_{ij}}{\delta s_M} * \frac{\Delta s_M}{s_M} + \frac{\delta L_{ij}}{\delta s_Y} * \frac{\Delta s_Y}{s_Y}$$
$$\Delta a_{i,j} = \frac{\delta a_{ij}}{\delta s_B} * \frac{\Delta s_B}{s_B} + \frac{\delta a_{ij}}{\delta s_C} * \frac{\Delta s_C}{s_C} + \frac{\delta a_{ij}}{\delta s_M} * \frac{\Delta s_M}{s_M} + \frac{\delta a_{ij}}{\delta s_Y} * \frac{\Delta s_Y}{s_Y}$$
$$\Delta b_{i,j} = \frac{\delta b_{ij}}{\delta s_b} * \frac{\Delta s_b}{s_b} + \frac{\delta b_{ij}}{\delta s_C} * \frac{\Delta s_C}{s_C} + \frac{\delta b_{ij}}{\delta s_M} * \frac{\Delta s_M}{s_M} + \frac{\delta b_{ij}}{\delta s_Y} * \frac{\Delta s_Y}{s_Y}$$

For one of zones Z1 to Z8 with r raster elements 30, there are (3*r) equations with the four unknowns $\Delta s_B$, $\Delta s_C$, $\Delta s_M$, and $\Delta s_Y$. The equations are solved in a step 37, in such a way that the total of the square errors is minimized. $\Delta L_{i,j}$, $\Delta a_{i,j}$, and $\Delta b_{i,j}$ are the components of weighted color deviation $C_{i,j}$ for a raster element 30(i,j).

For this exemplary embodiment, let it be assumed that printing in zones Z1 and Z2 took place using raster-tone printing. In zone Z3, let there be only text printed in black B. In zone Z4, let the color green be printed in full tone.

In a next step 38, for a reference image B1, B2, B3 in each instance, color distance $\Delta E_{B1}$, $\Delta E_{B2}$, $\Delta E_{B3}$ and the related color-distance vectors of the L*a*b color space which would result if the layer thickness changes $\Delta s_B$, $\Delta s_C$, $\Delta s_M$, and $\Delta s_Y$ of corresponding zones Z, calculated in step 37, were related to said reference images B1, B2, B3, are determined. Since the print image in zones Z1 and Z2 was produced using raster-tone printing, a homogeneous, rastered, gray image which is comprised, for example, of cyan with 70% area coverage and magenta and yellow area coverage with 60% each, is selected as reference image B1 for these zones Z1, Z2, and a homogeneous, black full-tone field is selected as reference image B2. The color-distance vectors of the L*a*b color space for reference image B1 result from the following systems of equations, in which layer-thickness changes $\Delta s_B$, $\Delta s_C$, $\Delta s_M$, and $\Delta s_Y$, which were already calculated, are used:

$$\Delta L_{B1} = \frac{\delta L_{B1}}{\delta s_C} * \frac{\Delta s_C}{s_C} + \frac{\delta L_{B1}}{\delta s_M} * \frac{\Delta s_M}{s_M} + \frac{\delta L_{B1}}{\delta s_Y} * \frac{\Delta s_Y}{s_Y}$$
$$\Delta a_{B1} = \frac{\delta a_{B1}}{\delta s_C} * \frac{\Delta s_C}{s_C} + \frac{\delta a_{B1}}{\delta s_M} * \frac{\Delta s_M}{s_M} + \frac{\delta a_{B1}}{\delta s_Y} * \frac{\Delta s_Y}{s_Y}$$
$$\Delta b_{B1} = \frac{\delta b_{B1}}{\delta s_C} * \frac{\Delta s_C}{s_C} + \frac{\delta b_{B1}}{\delta s_M} * \frac{\Delta s_M}{s_M} + \frac{\delta b_{B1}}{\delta s_Y} * \frac{\Delta s_Y}{s_Y}$$

From the coordinates, the color distance in reference image B1 is:

$$\Delta E_{B1} = \sqrt{\Delta L_{B1}^2 + \Delta a_{B1}^2 + \Delta b_{B1}^2}$$

The calculation is performed analogously for reference image B2.

Color-distance vectors ΔL, Δa, Δb and color distance ΔE of reference images B1 and B2 are stored in memory and displayed as characteristic values for the print quality in zones Z1 and Z2, respectively.

B2, in other words a homogeneous, black full-tone field, is also used as the reference image which is used for an assessment of the print quality in zone Z3. As already described above for the print image in zones Z1 and Z2, variables $\Delta E_{B2}$, $\Delta L_{B2}$, $\Delta a_{B2}$, $\Delta b_{B2}$ are determined by solving an equation system. Since essentially it is only the brightness that changes for printing ink B, which was printed in full tone in zone Z3, it is sufficient to store only $\Delta E_{B2}$ and $\Delta L_{B2}$ in memory or display them, as a quality measure for this zone Z3.

In zone Z4, the print image contains exclusively a full-tone print with the color green. A homogeneous full-tone image with the color green is used as reference image B3. Calculation of the quality measures $\Delta E_{B3}$, $\Delta L_{B3}$, $\Delta a_{B3}$, $\Delta b_{B3}$ takes place analogous to the method already described for reference image B1.

The quality measures can be indicated separately for each zone Z1 to Z8, or be related to the entire print image or partial regions of it, by applying mathematical operations. For example, it is possible to determine common quality measures for zones Z1 and Z2 of the print image, which were produced using multi-color raster printing in each instance. For this purpose, the mean values of the layer-thickness chances from zones Z1 and Z2 can be used:

$$\Delta s_B = (\Delta s_{B,Z1} + \Delta s_{B,Z2})/2$$

$$\Delta s_C = (\Delta s_{C,Z1} + \Delta s_{C,Z2})/2$$

$$\Delta s_M = (\Delta s_{M,Z1} + \Delta s_{M,Z2})/2$$

$$\Delta s_Y = (\Delta s_{Y,Z1} + \Delta s_{Y,Z2})/2$$

Quality measures $\Delta E_{B1}$, $\Delta L_{B1}$, $\Delta a_{B1}$, $\Delta b_{B1}$, derived from this then apply jointly for the print image of zones Z1 and Z2.

What is claimed is:

1. A method for assessing quality of a multi-color print image produced on a printing material in a multi-color printing process comprising the steps of:

generating signals for reproducing print-image elements by an image-recording device;

deriving color values from the signals for at least one of the print-image elements, the color values being transformed into color measures of a predetermined color space;

determining color distances between an actual color site and a desired reference color site for the at least one print-image element, with a measure for quality in at least one print-image region being derived from the color distances, an ink application in the at least one print-image region capable of being controlled with at least one control element;

calculating and storing correction variables of the at least one control element as a function of the color distances, the at least one control element capable of using the correction variables to minimize differences between actual color sites and respective reference color sites; and determining color-distance vectors and reference image color distances of at least one predetermined reference image with homogeneous area coverage as a measure for quality in the at least one print-image region, a second set of correction variables for compensation of the reference image color distances corresponding to the calculated and stored correction variables.

2. The method as recited in claim 1 further comprising the step of selecting a virtual print-monitoring element as the reference image.

3. The method as recited in claim 1 wherein for print produced by printing inks cyan (C), magenta (M), yellow (Y), and black (B) the method further comprises the steps of selecting a gray-balance field as one of the at least one reference image for the printing inks cyan (C), magenta (M), and yellow (Y) and selecting a field composed of the printing ink black as another of the at least one reference image for the printing ink black (B).

* * * * *